United States Patent [19]

Dellacorna

[11] Patent Number: 5,631,468
[45] Date of Patent: May 20, 1997

[54] TELECAMERA WITH A HIGH FRAME FREQUENCY AND ASSOCIATED MANUFACTURING METHOD

[75] Inventor: Alberto Dellacorna, Cisliano, Italy

[73] Assignee: B.T.S. Bioingegneria Tecnologia E Sistemi S.r.l., Milan, Italy

[21] Appl. No.: 436,805

[22] Filed: May 5, 1995

[30] Foreign Application Priority Data

May 6, 1994 [IT] Italy ............... MI94A0897

[51] Int. Cl.$^6$ ........................... G01J 5/32
[52] U.S. Cl. ........................... 250/339.05
[58] Field of Search ............ 250/339.05; 348/33, 348/265

[56] References Cited

U.S. PATENT DOCUMENTS

| 4,668,866 | 5/1987 | Kornfeld | 250/330 |
| 5,307,158 | 4/1994 | Tsuruta et al. | 348/265 |
| 5,353,056 | 10/1994 | Westerink et al. | 348/263 |

FOREIGN PATENT DOCUMENTS

| 0473259 | 3/1992 | European Pat. Off. . |
| 0474483 | 3/1992 | European Pat. Off. . |
| 2612030 | 9/1988 | France . |
| 58-85676 | 5/1983 | Japan . |
| 2175768 | 9/1988 | United Kingdom . |
| WO93/21560 | 10/1993 | WIPO . |

OTHER PUBLICATIONS

Roberto Racca, "High-speed video analysis system using multiple shuttered charge-coupled device imagers and digital storage", Optical Engineering, Jun. 1992, vol. 31, No. 6, pp. 1369-1374.

Primary Examiner—Constantine Hannaher
Attorney, Agent, or Firm—Young & Thompson

[57] ABSTRACT

A telecamera with a high frame frequency for detecting infrared radiation and visible radiation emitted by moving bodies has a lens, an optical device designed to subdivide the radiation into a flux of visible radiation and several fluxes of infrared radiation, several CCDs for detecting independently and sequentially the fluxes of infrared radiation, and one CCD for detecting the visible radiation. The data thus collected is converted into digital, optical and serial form and sent in a string to the central unit via an optical-fiber cable. The frame frequency which is obtained corresponds to the product obtained from the frequency of each CCD multiplied by the number of CCDs which detect the infrared radiation.

12 Claims, 2 Drawing Sheets

TELECAMERA WITH A HIGH FRAME FREQUENCY AND ASSOCIATED MANUFACTURING METHOD

BACKGROUND OF THE INVENTION

1. Field of the Invention

The present invention relates to an improved telecamera with a high frame frequency, particularly suitable for use, both on its own and together with other telecameras of the same type, in movement analysis systems.

Movement analysis systems are understood here as meaning mainly those systems which analyze the movement of the human body for medical and treatment purposes (diagnosis and rehabilitation of illnesses and traumas affecting the mobility of the body), for study (in science and sport) and also for artistic purposes (study and reproduction of the human movement in animated films and the like). The telecamera forming the subject of the present invention may however be used equally well in the study of other types of movement, both of animals and objects, analysis of which requires a high number of shots per time unit in order to be able to define with precision the nature of the movement itself.

2. Description of the Prior Art

The current movement analysis systems are based on the processing of video signals generated by one or more fixed black-and-white telecameras which record the movement of the subject, or rather the movement of some of the key points of the latter which are highlighted by special markers fixed to the subject; in the case of a human subject, these markers are applied for example to the points, the head and any other point which may used to represent in a significant manner the entire movement of the subject. Typically these markers consist of infrared radiation reflectors; the subject is in fact fully exposed to a source of infrared radiation, such that the infrared radiation reflected by the markers placed on the subject may be more easily detected with respect to the visible-range radiation forming the background image.

The signals emitted by the telecameras thus undergo a first processing operation which consists in extracting the useful information (supplied by the markers applied to the subject) from the background consisting of the visible image of the subject. This processing operation may be performed for example by means of a digital filter able to detect the presence of the markers which appear in the image by means of a light-threshold system, or rather, by means of analysis of the form and the dimension of the marker itself performed for example by means of correlation with a predefined mask. This analysis produces all of the markers' coordinates. Often this stage is preceded by an optical device (filter or separator prism) useful for attenuating the intensity of the visible radiation with respect to the infrared radiation emitted by the markers.

The raw data emitted by the digital filter (including, that is, the coordinates of the individual markers with the passing of time) is then further processed in a processor so as to reconstruct in a virtual and schematic manner the movement of the subject and allow a complete analysis thereof on a rational basis.

The overall processing capacity of the movement analysis systems currently in use is limited by the operating features of their essential components described above, and in particular by:

a) the power of resolution of the telecameras, or rather their sensitive element. This consists of a sensor of the CCD-type (Charge Coupled Device), and its resolution capacity depends on the pixel density (normally expressed as the number of pixels per unit length, in the horizontal and vertical directions);

b) frame repetition rate (referred to above and below simply as "frame frequency"); this parameter represents the frequency of sampling of the movements being analyzed and hence the quantity of information available per unit of time; in a system equipped with a given optical sensor, said parameter indicates the capacity of the latter to perform an accurate description, in analytical terms, of a movement, especially in the case of fast movements;

c) the processing speed of the digital filter; this speed must be fairly high so as to allow filtering of an entire frame before the next frame becomes available, so as to avoid the accumulation of information upstream of the filter and the consequent drawbacks;

d) the processing power of the processor which handles the data output by the filter.

According to the present state of the art and the electronic components market, the most limiting factors among those listed above are those indicated in paras. a) and b) and in particular the latter of the two. While, in fact, there is no difficulty in finding on the market, at an acceptable cost, the components necessary for manufacturing digital filters and processors of adequate power for the aforementioned requirements, there are instead problems in the CCD sector where it is currently not possible to find, in normal mass production, devices which allow both a high image quality and resolution and a high frame frequency.

The technological development of CCD-type sensors is in fact associated mainly with the market of mass-consumption goods (production of videocameras and security systems) and partly with that of filming devices for professional use. The products in the first sector are designed essentially on the basis of low-cost criteria and are therefore characterized by poor or exclusively specialized performance features and for these reasons cannot be conveniently used in the movement analysis systems of the present invention. The products in the second sector, in return for a higher cost, offer both high resolution (thus making it possible to fulfil in a satisfactory manner the requirements mentioned in the aforementioned para. a)) and good versatility of use, but they all have characteristics corresponding to the currently applicable television standards and in particular their frame frequency is still 50 or 60 frames per second.

With the advances made by technology, in the field of the movement analysis systems dealt with by the present invention, it has been established however that this movement detection frequency, although entirely acceptable in a normal television recording which is undoubtedly of high quality, is nevertheless insufficient when one wishes to obtain a significant analytical representation of a fast movement. It has in fact been determined that for a correct representation of these movements a frame frequency of not less than 200 Hz would be necessary.

The most advanced telecameras which have been developed in the technical sector hitherto for the aforementioned applications, however, reach a maximum frequency of 100 Hz. This frequency has been obtained—at the cost of a certain deterioration in the electrical and optical characteristics of the CCD—by modifying the timing circuit of a standard professional 50 Hz CCD, so as to double the response frequency thereof. This "forcing" of the CCD, however, cannot be applied any further without compromising excessively the response quality of the CCD, nor on the other hand can the construction of special high-frequency CCDs be contemplated—even though theoretically possible—since their cost would be such that it would be absolutely impossible to use them for this type of application.

SUMMARY OF THE INVENTION

The aim of the present invention, therefore, is that of providing a telecamera with a high frame frequency for fast-movement analysis systems, the sensitive element of which consists of 50 or 60 Hz CCDs which are commercially available.

Another aim of the present invention is that of providing a telecamera of the aforementioned type which is of relatively modest constructional complexity, so as to achieve a cost which is not disproportionate compared to that of the telecameras currently available with a frame frequency equivalent to 100 Hz.

These aims are achieved, according to the present invention, by means of a telecamera with a high frame frequency for detecting radiation emitted by moving bodies, characterized in that it comprises: a lens, an optical device designed to subdivide the radiation received by said lens into a plurality of separate fluxes, a corresponding plurality of CCDs for independently detecting each of said radiation fluxes, and a timing device which activates said CCDs sequentially.

BRIEF DESCRIPTION OF THE DRAWINGS

Further characteristic features and advantages of the present invention will emerge, however, more clearly from the detailed description of preferred embodiments thereof, illustrated in the accompanying drawings, in which.

DESCRIPTION OF THE PREFERRED EMBODIMENTS

Figure 1:
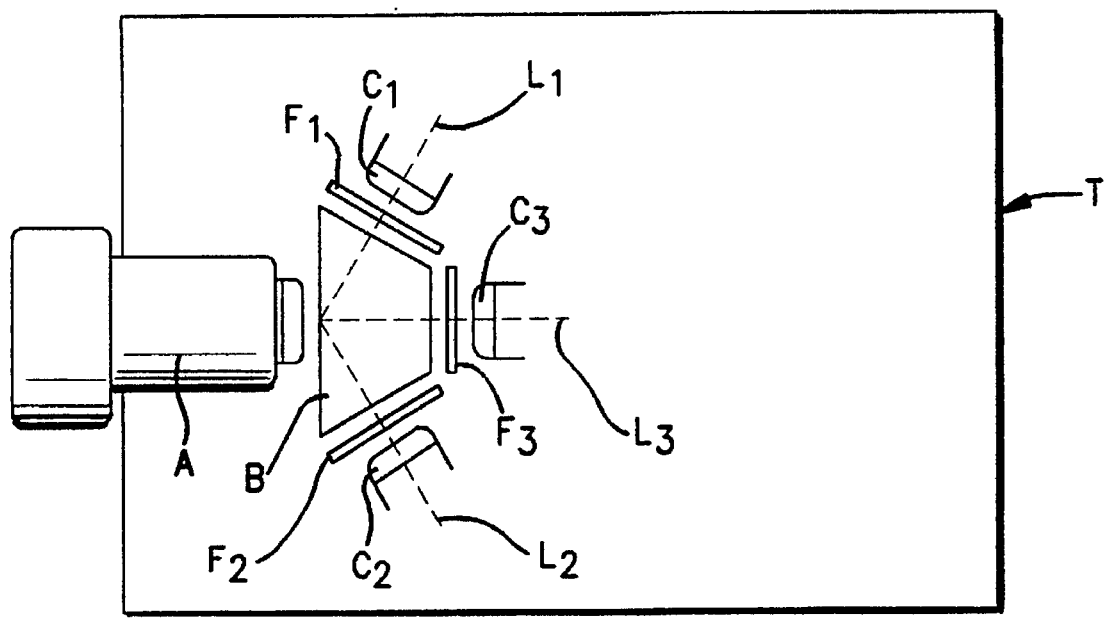
FIG. 1 is a schematic view of the image detection device in a first embodiment of the telecamera according to the present invention.

As illustrated in FIG. 1, the telecamera T according to the present invention comprises a lens A and an optical device B (beam splitter), by means of which the radiation striking the lens A is split up into three equal fluxes, in the three directions indicated by the lines L1, L2 and L3. Both the lens A and the device B are shown in schematic and basic form since the devices in question are well known and commercially available.

The exit points of the three aforementioned radiation fluxes from the optical device B have arranged opposite them respective CCD devices (C1, C2, C3) for detecting the radiation striking them and converting it into an electrical analog signal. In the embodiment illustrated, which refers to a telecamera with a frame frequency of 200 Hz, the devices C1 and C2 are of the black-and-white type with a nominal frequency of 50 or 60 Hz, increased to 100 or 120 Hz in the known manner mentioned above, and are used for analysis of the movement. The device C3, on the other hand, is of the color type, with a standard frequency of 50 or 60 Hz and incorporated pixel colour-filters, and is used to obtain a colour image of the entire scene with the moving subject, which is helpful for the clear interpretation of the movement diagrams obtained from processing of the signals supplied by the devices C1 and C2.

As stated in the introductory part, the markers placed on the moving subject are frequently infrared radiation reflectors. In this case, therefore, it is necessary to position between the optical device B and the devices C special filters able to obtain the required separation between the useful infrared signals and the light signals of the background image. In particular, the devices C1 and C2 will have opposite them low-pass infrared filters F1 and F2 which greatly attenuate the visible radiation (background) with respect to the infrared radiation (markers). On the other hand, the device C3 will have opposite it an infrared rejection filter F3 which attenuates the infrared radiation without disturbing the visible radiation which forms the image of the scenery and the subject.

Figure 2:
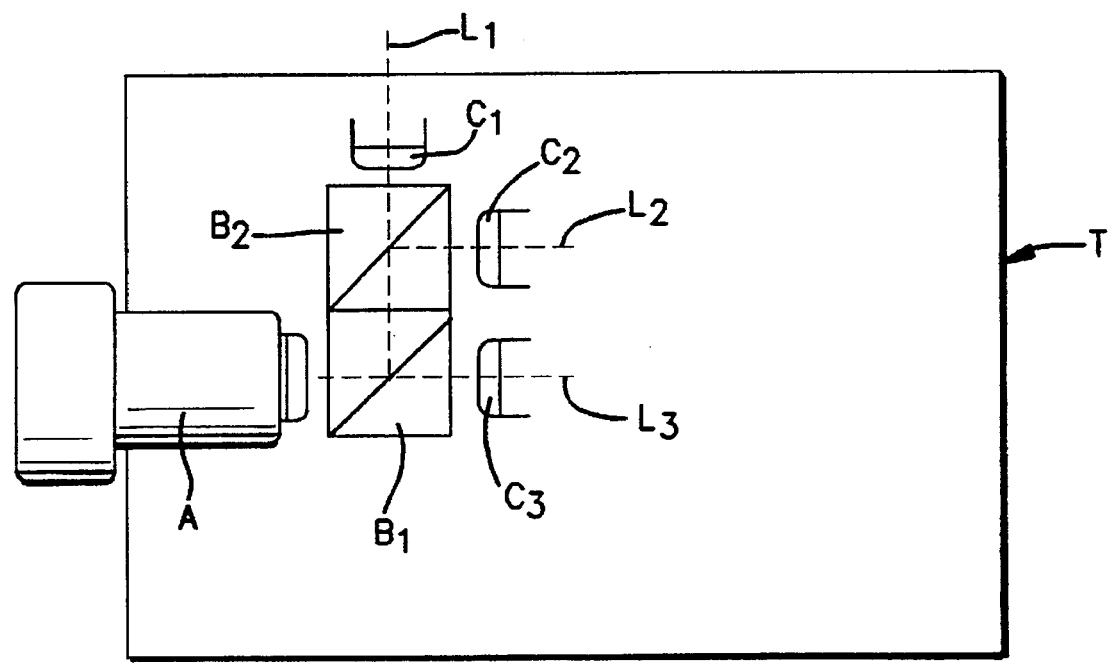
FIG. 2 is a schematic view of the image detection device in a second embodiment of the telecamera according to the present invention.

In a second embodiment of the telecamera according to the present invention, illustrated in FIG. 2, the image detection device comprises a first optical device B1 which separates all the radiation emitted by the lens A into visible radiation and infrared radiation. The visible radiation is sent in the direction of the line L3 onto the CCD C3 for detecting the visible image of the background scenery, while the infrared radiation emerging from the optical device B1 is sent to a second optical device B2 which subdivides it into two identical fluxes which are sent in the direction of the lines L1 and L2 onto the CCDs C1 and C2 for detecting the infrared radiation emitted by the markers. The degree of separation which can be obtained in the optical device B1 is sufficiently high to make the presence of the filters F unnecessary in this embodiment.

This second embodiment is particularly advantageous when it is indispensable to take shots under normal light conditions. Since, in fact, the subdivision of the fluxes (and hence the proportional reduction of their intensity) is carried out only on the infrared radiation and not on the visible radiation, there is no need to increase the intensity of the visible light emitted by the normal illumination sources. This is particularly important in all those applications of the invention where the subject recorded is a human being and in particular in applications of a medical nature; in these cases, in fact, it is extremely important, for the purposes of a correct analysis, that the movement of the subject should be as natural as possible. Consequently it is essential to avoid any psychological influence on the subject, such as precisely that arising from special and/or strong lighting conditions which would condition the latter's movement.

According to a fundamental characteristic feature of the invention, the radiation striking the lens A and distributed by the optical devices B is detected by the devices C1 and C2 at a regularly alternating rate. In the example illustrated here, the phase-difference in the detection of the signal by the CCDs C1 and C2 is 180° (generally speaking this phase-difference is equal to 360°/n, where n is the total number of CCDs). It is clear therefore that by reading in succession the images received by said devices an actual frame frequency is obtained, equivalent to twice that of the individual CCD devices used, in this case 200 Hz.

In order to ensure uniformity of the images supplied by the two different CCDs, however, it is indispensable for the devices C1 and C2 to be perfectly collimated before use. This result may be achieved, according to the present invention, with different collimation methods. According to a first method, the CCD devices C1 and C2 are collimated with one another in an exclusively mechanical manner. This method is not preferred, however; in fact, in order to obtain a collimation with the necessary extremely high degree of precision (it must in fact be such that it ensures image-coincidence of the two CCDs as regards the individual pixels over the entire area of the CCD), this operation must be performed with fairly sophisticated and costly machinery, so that the cost of the telecamera would be increased excessively as a result.

In a second preferred method, the collimation comprises a first mechanical phase in which the CCDs are collimated with a relatively small degree of precision and a second phase involving fine adjustment by means of electronic collimation where the errors of misalignment between the images supplied by the devices C1 and C2 are calculated and archived in a special conversion matrix stored in a permanent-memory device installed in the telecamera. In practice this is obtained with an initial operation of calibration of the telecamera, performed at the end of manufacture, in which a fixed grid of luminous markers is placed in front of the telecamera, and the images of this grid detected by the two different CCD devices are superimposed perfectly using a procedure involving linear transformation of the data supplied by one of the CCDs.

This collimation procedure can be performed simply and quickly, owing to the fact that the linear transformation is thus carried out not on all the pixels of the picture, but only on a limited number of points (i.e. the markers) suitably distributed over the picture and taken to be representative of a certain zone thereof, points whose individual coordinates, owing to the digital filter used by the telecamera, can be easily identified. The calibration procedure is obviously performed automatically, using a suitable processor program which compares the data supplied by the two CCDs for each of the markers and calculates the corresponding misalignment, storing it. When the telecamera is operated, the processing unit associated with the latter reads first of all the collimation data stored in the memory device of the telecamera and thus uses it to convert automatically and continuously the data supplied by one of the CCDs, so that it is perfectly uniform with that detected by the other CCD.

The collimation procedure described above is particularly advantageous. In fact the greater cost associated with the memory installed in the telecamera and the processing capacity required to perform continuously the linear transformation of the data of one of the two CCDs is considerably less than the saving in costs which is achieved during the mechanical phase of collimation, which can be performed in this case with apparatus of an entirely ordinary nature. Moreover the possibility of performing an electronic collimation procedure "downstream" also makes it possible to recover slight distortions due to the optical devices which may therefore be selected from a "normal" quality range, without this giving rise to any anomalies in operation of the telecamera, with a further advantage as regards the production costs of the telecamera.

During dimensioning of the optical devices B, the length of the optical path of each radiation flux which passes through them is adjusted in accordance with the average wave length of the radiation itself, so that the focal plane of each radiation flux coincides exactly with the assembly plane of the corresponding detection CCD, both as regards the infrared radiation of the devices C1 and C2 and as regards the visible radiation of the device C3. With this expedient, focussing alone of the lens A guarantees a clear image uniformly provided on all the CCDs.

Figure 3:
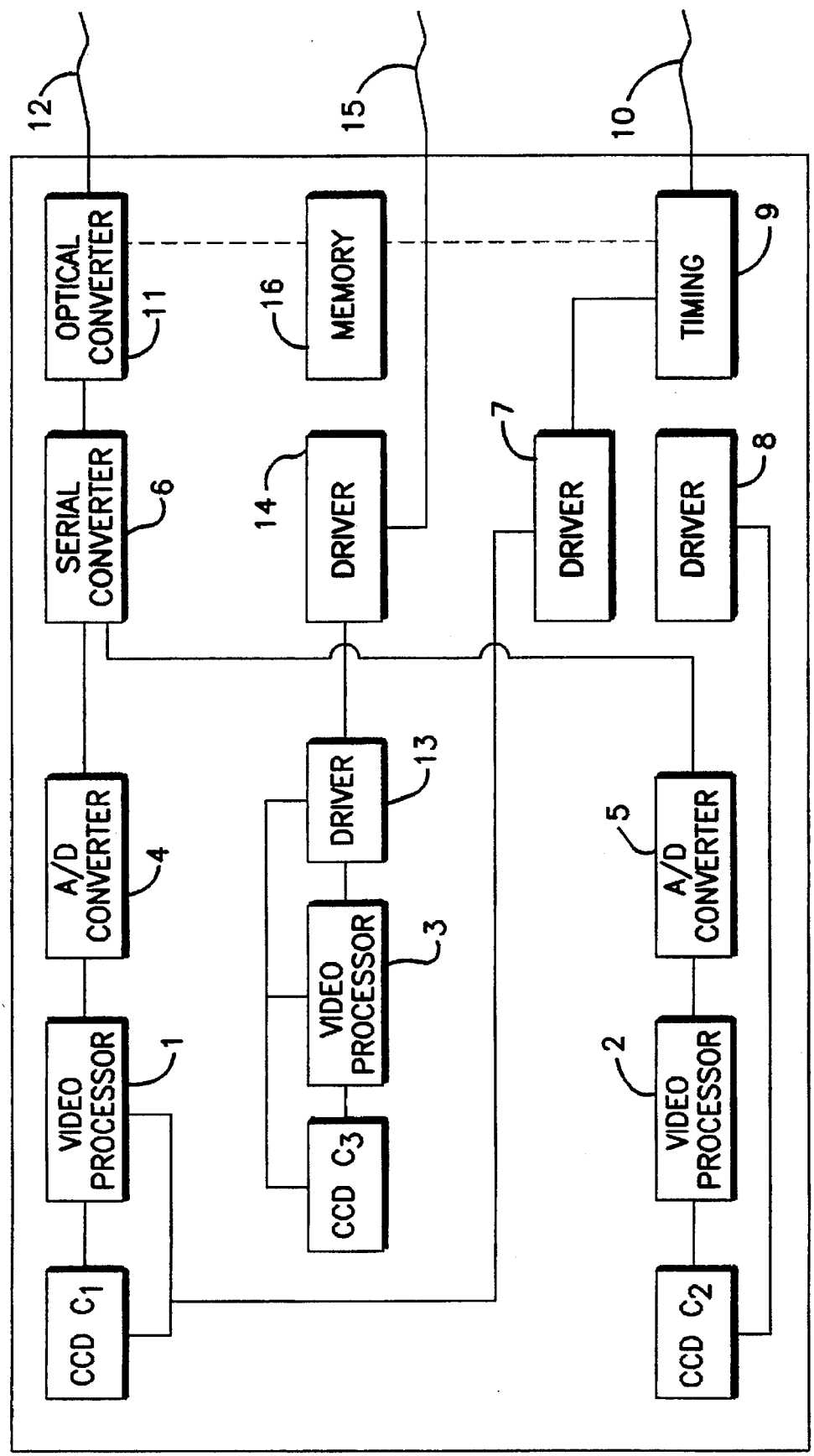
FIG. 3 is a block diagram relating to electronic processing of the data collected by the device according to FIG. 1.

The electronic circuit associated with the image detection device described above is illustrated in the block diagram in FIG. 3. The signals emitted by the devices C1 and C2 are processed by the videoprocessors 1 and 2, respectively, which perform sampling of the useful signal emitted by said CCD devices. The said videoprocessors then effect a first filtering of the signals and the amplification necessary for the next stage. The latter consists of A/D converters 4 and 5 which perform the analog/digital conversion of the signals.

The digital data thus obtained is then converted into serial form in the block 6 which also formats it into a single output string which contains alternately and in sequence the data supplied by the videoprocessors 1 and 2. The time sequence with which the data is received from the blocks 1 and 2 is regulated by a timing block 9, via the command blocks 7 and 8 controlled by the latter. The block 9 is then connected to the exterior via the telecamera power supply and synchronization cable 10.

The electric serial signals leaving the block 6 may be directly used. Alternately, and preferably, they are transformed by means of an optical converter 11 into optical signals and said signals are sent to a central storage and analysis unit via an optical-fiber cable 12. This arrangement is particularly interesting because the telecamera thus has a high immunity to electromagnetic disturbances, thus allowing a greater precision in the detection of the kinematic data. It must be emphasized in fact that the stream of data supplied by the block 6 is considerably high, for example greater than 100 MB/s, and therefore the transmission of the said data is particularly delicate. The transmission by optical means using the optical-fiber cable 12 guarantees the maximum transmission fidelity, independently of the presence of electromagnetic fields in the environment, and moreover has a lower cost.

Independently of the signals of the devices C1 and C2 relating to movement analysis, but if necessary in synchronism with them, the color video signal of the device C3 is detected by means of a videoprocessor 3, controlled by a command block 13, which transmits in a known manner the signals to the exterior of the telecamera via a coaxial cable 15, operation of which is controlled by a command block 14. The command block 13 is further connected to the timing block 9 for adjusting, when necessary, synchronization of the visible signals with the infrared signals. The block 16, finally, indicates the memory device used to store the matrix of collimation data. Depending on the connection methods used to transfer the data of the memory 16 to the fixed storage and analysis unit, the memory device 16 is connected to the blocks 9 or 11.

From the aforementioned description it is clear how the present invention has fully achieved the preset aims. With the telecamera described above, in fact, it is possible to obtain a high frame frequency, far higher than the maximum frequency of 100 Hz which can be obtained hitherto, using the relatively low-cost 50 or 60 Hz CCDs which are commercially available. Moreover it can be manufactured using methods which are not particularly sophisticated and whose cost therefore will not increase excessively the final cost of the machine.

The telecamera according to the present invention—as is obvious from the embodiments provided by way of example in the present description—offers moreover the advantage that it provides simultaneously both the data which allow processing of a virtual schematic image of the subject's movement, which can be analysed using mathematical methods, and a visible image of the entire scene which is captured with the moving subject. A comparative examination of these two types of image allows one to comprehend more immediately the virtual image of the movement and to study it more quickly and easily.

Finally, although the telecamera of the present invention has been described with reference to the particular embodiments thereof, whereby analytical data and visual data relating to the movement under study are made available simultaneously, it is nevertheless obvious that, for particular studies, other types of telecamera may be provided—all of which are obviously included in the protective scope of the present patent—in which all the radiation fluxes emerging from the optical devices B are used for analysis of the movement, by suitably phase-displacing the collection of the data of the individual CCDs by 120° (360°/3, instead of 180°. In this case, and still using the same types of aforementioned CCD devices, the frame frequency which can be achieved will be 300 Hz.

It is, moreover, possible to envisage the use of optical devices which subdivide the radiation entering the telecamera lens into more than three directions so as to obtain new possible levels of frequency or performance of the telecamera, all of these variations obviously falling within the protective scope of the present invention, as defined in the accompanying claims.

I claim:

1. Telecamera with a high frame frequency for detecting infrared radiation emitted by spot-shaped markers fixed to moving bodies and visible radiation emitted by said moving bodies as a whole comprising: a lens, an optical device which subdivides the radiation received by said lens into a plurality of separate radiation fluxes, a corresponding plurality of CCDs for independently detecting each of said radiation fluxes, a timing device which activates said CCDs sequentially, and a reading device which reads, in succession, images received by individual CCDs among said plurality of CCDs, thereby resulting in a telecamera having a frame frequency greater than a frame frequency of any individual CCD among said plurality of CCDs.

2. Telecamera as claimed in claim 1, wherein said optical device subdivides the radiation received by the lens into said fluxes, one of the fluxes being filtered with a high-pass filter for rejecting the infrared radiation and the remaining fluxes being filtered with low-pass filters for rejecting the visible radiation, all said high-pass and low-pass filters being arranged upstream of respective ones of said plurality of CCDs.

3. Telecamera as claimed in claim 1, wherein the optical device subdivides the radiation received by the lens into one flux substantially comprising only visible radiation, and remaining fluxes substantially comprising only infrared radiation, said optical device evenly dividing said infrared radiation among said remaining fluxes.

4. Telecamera as claimed in claim 1, wherein the timing device controls phase-displacement of the reading of the CCDs detecting the infrared radiation fluxes at a value of 360°/n, where n is the total number of said CCDs.

5. Telecamera as claimed in claim 1, wherein the signals emitted by the CCDs detecting the infrared radiation, after being filtered and amplified in respective videoprocessors, are converted into serial digital form and then formatted into a single string containing sequentially the information supplied in an ordered sequence by all the said CCDs.

6. Telecamera as claimed in claim 5, wherein said string of electric digital signals is converted into a corresponding string of optical signals and sent to a central storage and analysis unit by means of an optical-fiber cable.

7. Telecamera as claimed in claim 1, comprising two CCDs for detecting the infrared radiation fluxes and one CCD for detecting the visible radiation flux.

8. Method for manufacturing a telecamera as claimed in claim 1, wherein collimation of the signals emitted by the CCDs detecting the infrared radiation fluxes comprises a first phase, having a relatively low degree of accuracy, in which said CCDs are positioned and fixed mechanically, and a second phase, involving fine adjustment, in which collimation of said signals is performed electronically.

9. Manufacturing method as claimed in claim 8, wherein said electronic collimation is performed by calculating a linear transformation required to superimpose an image of a same fixed grid detected by each of said CCDs onto the image of said grid detected by one of said CCDs, taken as a reference, and permanently storing said linear transformation in a memory device of the telecamera.

10. Telecamera as claimed in claim 1, wherein the CCDs for detecting the infrared radiation fluxes are of the black-and-white type, each having a nominal frame frequency of 50 or 60 Hz, which nominal frame frequency is doubled to 100 or 200 Hz.

11. Telecamera as claimed in claim 1, wherein the CCD for detecting the visible radiation flux is of the color type and has a frame frequency of 50 or 60 Hz.

12. Telecamera as claimed in claim 1, wherein a length of an optical path of the separate radiation fluxes inside said optical device is fixed according to an average wave-length of each flux, so that a focal plane of the radiation emerging from the optical device coincides with an assembly plane of the respective CCD.

* * * * *